(12) United States Patent
Lee et al.

(10) Patent No.: US 11,434,579 B2
(45) Date of Patent: Sep. 6, 2022

(54) DEVICE COMPRISING METAL HOUSING

(71) Applicant: Samsung Electronics Co., Ltd., Suwon-si (KR)

(72) Inventors: Yoonhee Lee, Suwon-si (KR); Sungho Cho, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 15/733,235

(22) PCT Filed: Jan. 8, 2019

(86) PCT No.: PCT/KR2019/000258
§ 371 (c)(1),
(2) Date: Jun. 15, 2020

(87) PCT Pub. No.: WO2019/135664
PCT Pub. Date: Jul. 11, 2019

(65) Prior Publication Data
US 2021/0095388 A1    Apr. 1, 2021

(30) Foreign Application Priority Data

Jan. 8, 2018  (KR) ........................ 10-2018-0002237

(51) Int. Cl.
*C25D 11/04* (2006.01)
*C22C 21/00* (2006.01)
*H04M 1/02* (2006.01)

(52) U.S. Cl.
CPC .............. *C25D 11/04* (2013.01); *C22C 21/00* (2013.01); *H04M 1/026* (2013.01); *H04M 1/0283* (2013.01)

(58) Field of Classification Search
CPC .................. H05K 5/00–069; C25D 11/04–246
See application file for complete search history.

(56) References Cited

U.S. PATENT DOCUMENTS

2010/0183869 A1   7/2010   Lin et al.
2013/0008796 A1   1/2013   Silverman et al.
(Continued)

FOREIGN PATENT DOCUMENTS

KR    10-2013-0040322 A    4/2013
KR    10-2013-0098031 A    9/2013
(Continued)

OTHER PUBLICATIONS

Korean Intellectual Property Office, "Decision of Patent" dated Nov. 3, 2021, in connection with counterpart Korean Patent Application No. 10-2018-0002237, 7 pages.
(Continued)

*Primary Examiner* — Harry D Wilkins, III
*Assistant Examiner* — Ho-Sung Chung

(57) ABSTRACT

A portable communication device according to various embodiments includes a housing that forms at least a portion of an external surface of the portable communication device, wherein at least a portion of an area of the housing comprises: an aluminum alloy substrate including 90.0 to 99.8 weight % (wt %) of aluminum (Al) and 0.2 to 1.0 wt % of manganese (Mn); and an anodized layer including aluminum oxide ($Al_2O_3$) formed on the aluminum alloy substrate, wherein the anodized layer has a first hole and a second hole formed in the anodization layer, wherein the anodized layer may comprise: a plurality of holes including a first hole and a second hole, formed in the anodized layer; a plurality of first channels extending from at least a portion of a surface of the anodized layer to the first hole in a first direction substantially perpendicular thereto, a second channel extending from the first hole toward the aluminum alloy substrate in a second direction different from the first direction, and a third channel extending from the first hole toward the aluminum alloy substrate in a third direction different
(Continued)

from the first direction and the second direction. Other embodiments are possible.

15 Claims, 13 Drawing Sheets

(56) References Cited

U.S. PATENT DOCUMENTS

| | | |
|---|---|---|
| 2013/0093299 A1 | 4/2013 | Cho et al. |
| 2014/0193607 A1 | 7/2014 | Browning et al. |
| 2015/0090598 A1* | 4/2015 | Tatebe .................. C25D 11/08 205/333 |
| 2015/0096893 A1 | 4/2015 | Jeong et al. |
| 2016/0024680 A1 | 1/2016 | Browning et al. |
| 2016/0060731 A1 | 3/2016 | Hwang et al. |

FOREIGN PATENT DOCUMENTS

| | | |
|---|---|---|
| KR | 10-2013-0132632 A | 12/2013 |
| KR | 10-2015-0040631 A | 4/2015 |
| KR | 10-1571289 B1 | 11/2015 |
| KR | 10-2016-0027853 A | 3/2016 |

OTHER PUBLICATIONS

ISA/KR, International Search Report and Written Opinion of the International Searching Authority, International Application No. PCT/KR2019/000258, dated Apr. 19, 2019, 9 pages.

Supplementary European Search Report in connection with European Application No. 19735717.1 dated Oct. 30, 2020, 10 pages.

* cited by examiner

DEVICE COMPRISING METAL HOUSING

CROSS-REFERENCE TO RELATED APPLICATIONS

This application is a 371 National Stage of International Application No. PCT/KR2019/000258, filed Jan. 8, 2019, which claims priority to Korean Patent Application No. 10-2018-0002237, filed Jan. 8, 2018, the disclosures of which are herein incorporated by reference in their entirety.

BACKGROUND

1. Field

Various embodiments relate to a device including a metal housing.

2. Description of Related Art

Electronic devices can complexly perform various functions. For example, a portable communication device, a Personal Digital Assistant (PDA), an electronic notebook, a smartphone, a tablet Personal Computer (PC), etc. have been developed to be able to achieve improved performance and provide much convenience to users. Electronic devices can provide various functions such as not only the function of radio transmission/reception, but also a photograph, music video, multimedia, and games.

As electronic devices are popularized, not only the functional respect of the electronic device, but also the design respect is emphasized. For example, an electronic device may include a metal housing in at least a portion of the external appearance.

SUMMARY

As a method for making a metal housing, which is included in at least a partial area of the external appearance of a device, look uniformly white, there is a method of forming prominences and recessions on the surface of the metal using blasting, etching, or laser processing, a method of forming an opaque white film using an special alloy, or a method of injecting metal salt, which shows white, into a metal housing.

However, when prominences and recessions are formed on the surface of metal, the uniformity of the color of an electronic device may be deteriorated due to differences in roughness of the surface, and the method of forming a non-uniform film on a surface using a laser requires additional equipment, so the processing cost may increase. Further, according to the method of injecting metal salt that shows white into a metal housing, the metal housing may become a color closer to gray rather than white.

Various embodiments can provide a device including a metal housing having a uniform white appearance.

A portable communication device according to various embodiments includes a housing configured to form at least a portion of an outer surface of the portable communication device, in which at least a partial area of the housing includes: an aluminum alloy substrate containing 90.0 to 99.8 weight percent (wt %) aluminum (Al) and 0.2 to 1.0 wt % manganese (Mn); and an anodized layer formed on the aluminum alloy substrate and containing an aluminum oxide ($Al_2O_3$), in which the anodized layer has: a plurality of holes formed in the anodized layer and including a first hole and a second hole; and a plurality of first channels extending from at least a portion of a surface of the anodized layer to the first hole in a first direction substantially vertical thereto, a second channel extending from the first hole toward the aluminum alloy substrate in a second direction different from the first direction, and a third channel extending from the first hole toward the aluminum alloy substrate in a third direction different from the first direction and the second direction.

An electronic device according to various embodiments includes: a housing configured to form at least a portion of a rear side of the electronic device and at least a portion of a side of the electronic device; and a display at least partially accommodated by housing and visually exposed outside the electronic device, in which at least a portion of the housing includes: an aluminum alloy substrate containing 90.0 to 99.8 wt % aluminum (Al); and an anodized layer including an aluminum oxide ($Al_2O_3$) formed on the aluminum alloy substrate, in which the anodized layer includes: a plurality of holes including a first hole and a second hold formed in the anodized layer; and a plurality of first channels extending from at least a portion of a surface of the anodized layer to the first hole in a first direction substantially vertical thereto, a second channel extending from the first hole toward the aluminum alloy substrate in a second direction different from the first direction, and a third channel extending from the first hole toward the aluminum alloy substrate in a third direction different from the first direction and the second direction.

A method of manufacturing an electronic device according to various embodiments includes: providing an aluminum alloy substrate containing 90.0 to 99.8 wt % aluminum (Al); forming an anodized layer containing an aluminum oxide ($Al_2O_3$) on a surface of the aluminum alloy substrate; forming a plurality of first channels extending from at least a portion of a surface of the anodized layer to the aluminum alloy substrate in a first direction substantially vertical thereto; forming a plurality of holes including a first hole and a second hole at least one of positions where at least one channel of the plurality of first channels and other metal except for the aluminum meet each other; forming a second channel extending from at least one hole of the plurality of holes toward the aluminum alloy substrate in a second direction different from the first direction and a third channel extending toward the aluminum alloy substrate in a third direction different from the first direction and the second direction; and forming a housing configured to form at least a portion of an outer surface of the electronic device using the aluminum alloy substrate having the anodized layer having the first channels, the second channel and the third channel.

According to various embodiments, a device includes a metal housing having a uniform white color even without a separate increase in cost, thereby being able to provide an aesthetic appearance.

DETAILED DESCRIPTION

Figure 1:
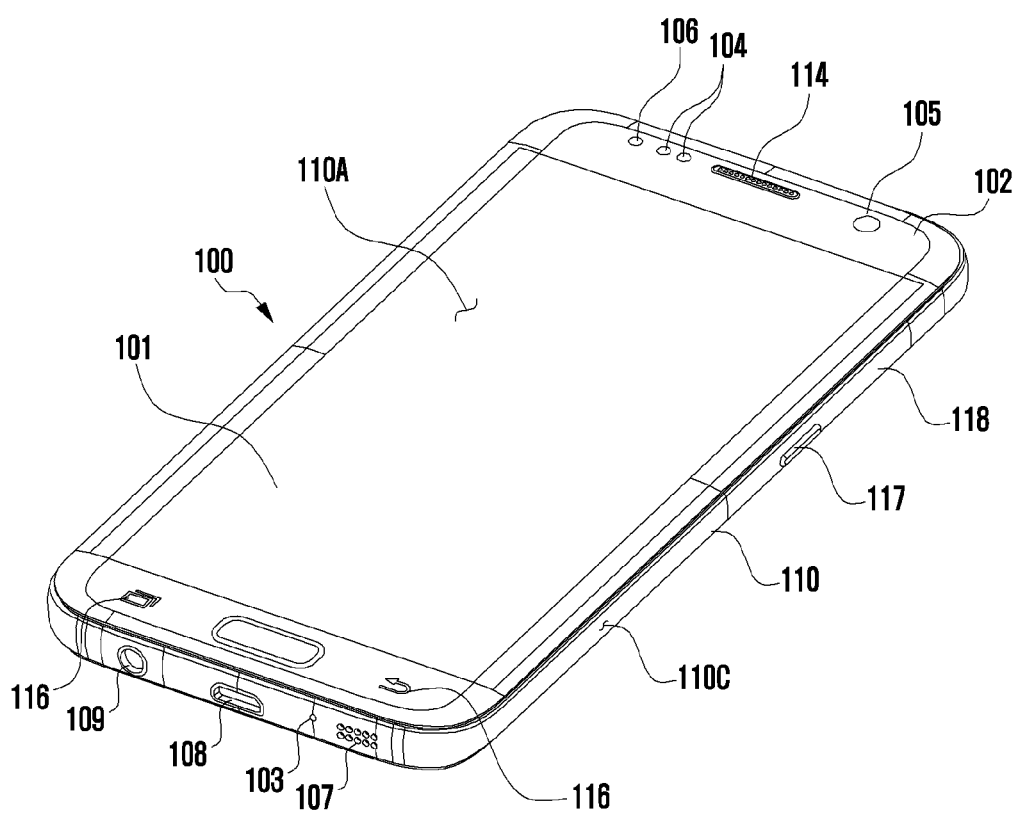
FIG. 1 is a front perspective view of an electronic device according to an embodiment.

Hereinafter, various embodiments will be described with reference to the accompanying drawings. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

As used herein, the expression "have", "may have", "include", or "may include" refers to the existence of a corresponding feature (e.g., numeral, function, operation, or constituent element such as component), and does not exclude one or more additional features.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly or via the other element (e.g., a third element).

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the disclosure should not be interpreted to exclude embodiments of the disclosure.

An electronic device according to various embodiments of the disclosure may be a device with a communication function. For example, the electronic device may include at least one of a smart phone, a tablet personal computer (PCs), a mobile phone, a video phone, an e-book reader, a desktop PC, a laptop PC, a netbook computer, a personal digital assistant (PDA), a portable multimedia player (PMP), a MP3 player, a mobile medical device, a camera, a wearable device (e.g., head-mounted-device (HIVID) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). An electronic device according to various embodiments of the disclosure may be a combination of one or more of above described various devices. Also, an electronic device according to various embodiments of the disclosure may be a flexible device. Also, an electronic device according to various embodiments of the disclosure is not limited to the above described devices.

Figure 2:
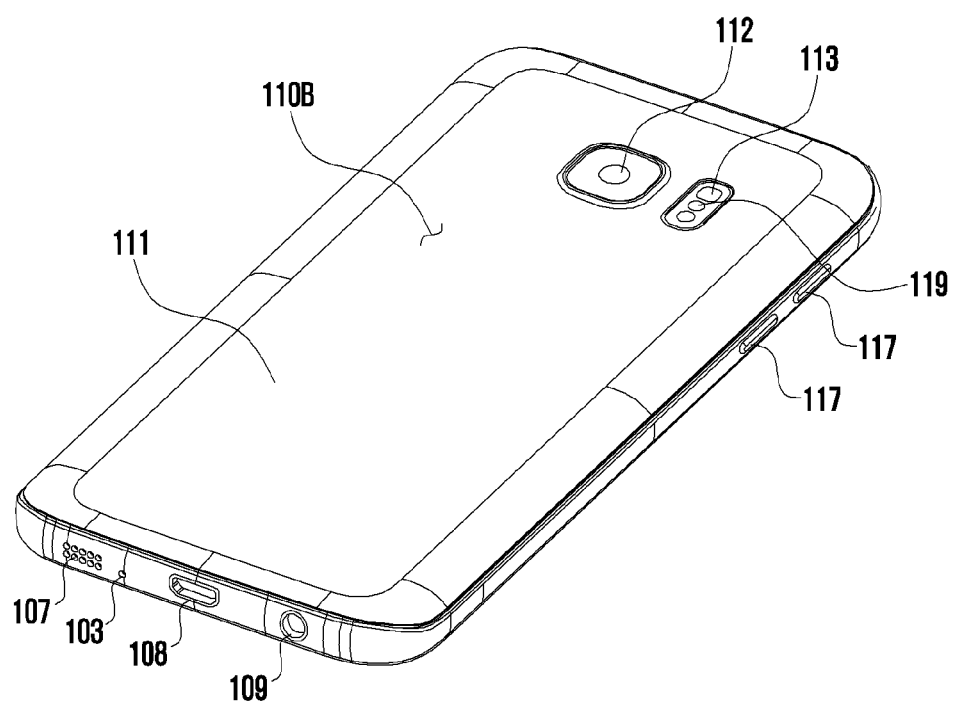
FIG. 2 is a perspective view showing the rear side of the electronic device of FIG. 1 according to an embodiment.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. The display 101 may be coupled to or arranged adjacent to a touch sensing circuit, a pressure sensor capable of measuring the intensity (pressure) of a touch, and/or a digitizer that detects a magnetic field-type stylus pen.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101.

The light-emitting element 106 may be arranged on the first surface 110A of the housing 110, for example. The light-emitting element 106 may provide information regarding the condition of the electronic device 100 in a light type and may include an LED, for example.

The connector holes 108 and 109 may include a first connector hole 108 capable of containing a connector (for example, a USB connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
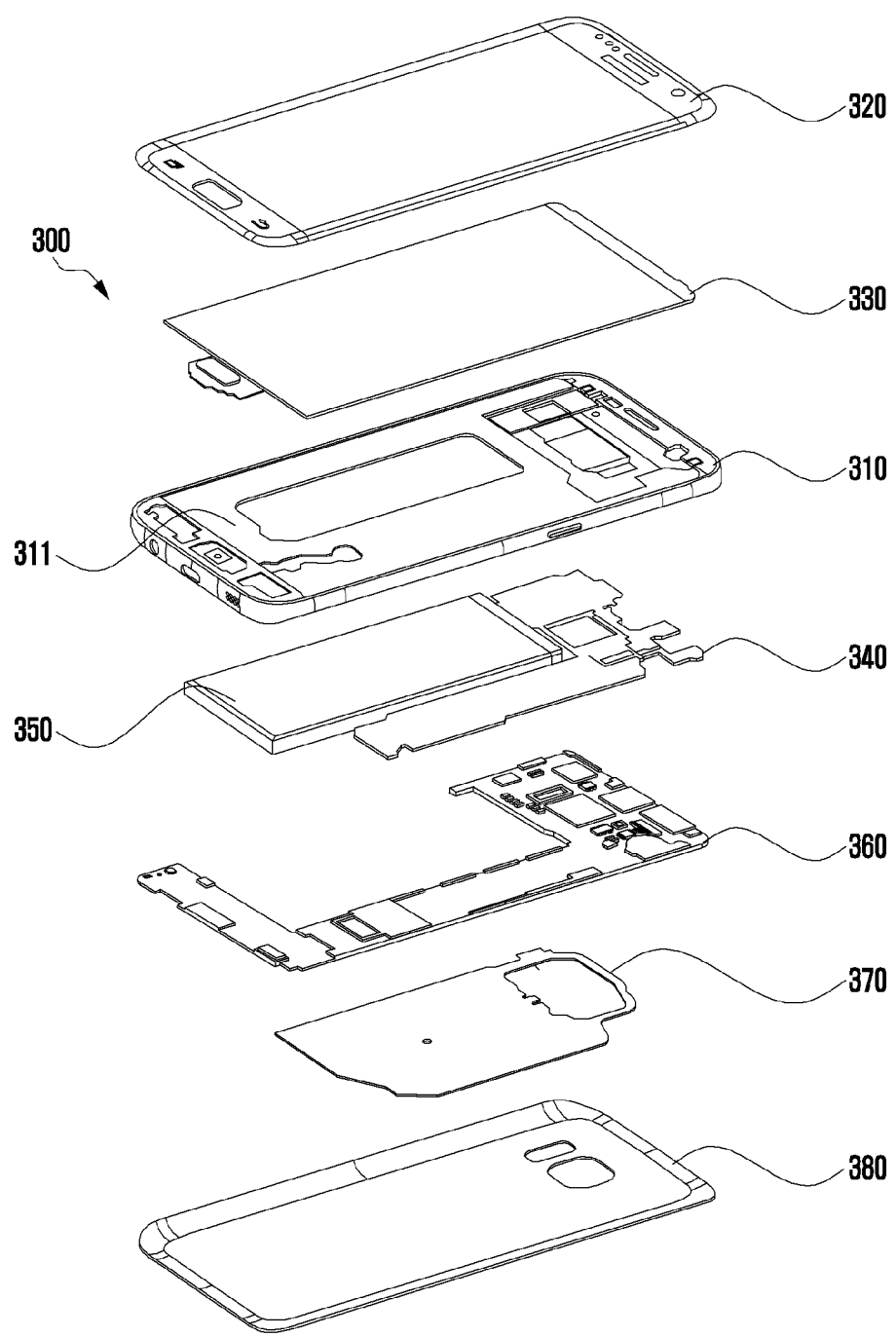
FIG. 3 is an exploded perspective view of the electronic device of FIG. 1 according to an embodiment.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, an sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example.

In another embodiment, an antenna structure may be formed by a part or a combination of the side bezel structure 310 and/or the first support member 311.

Figure 4A:
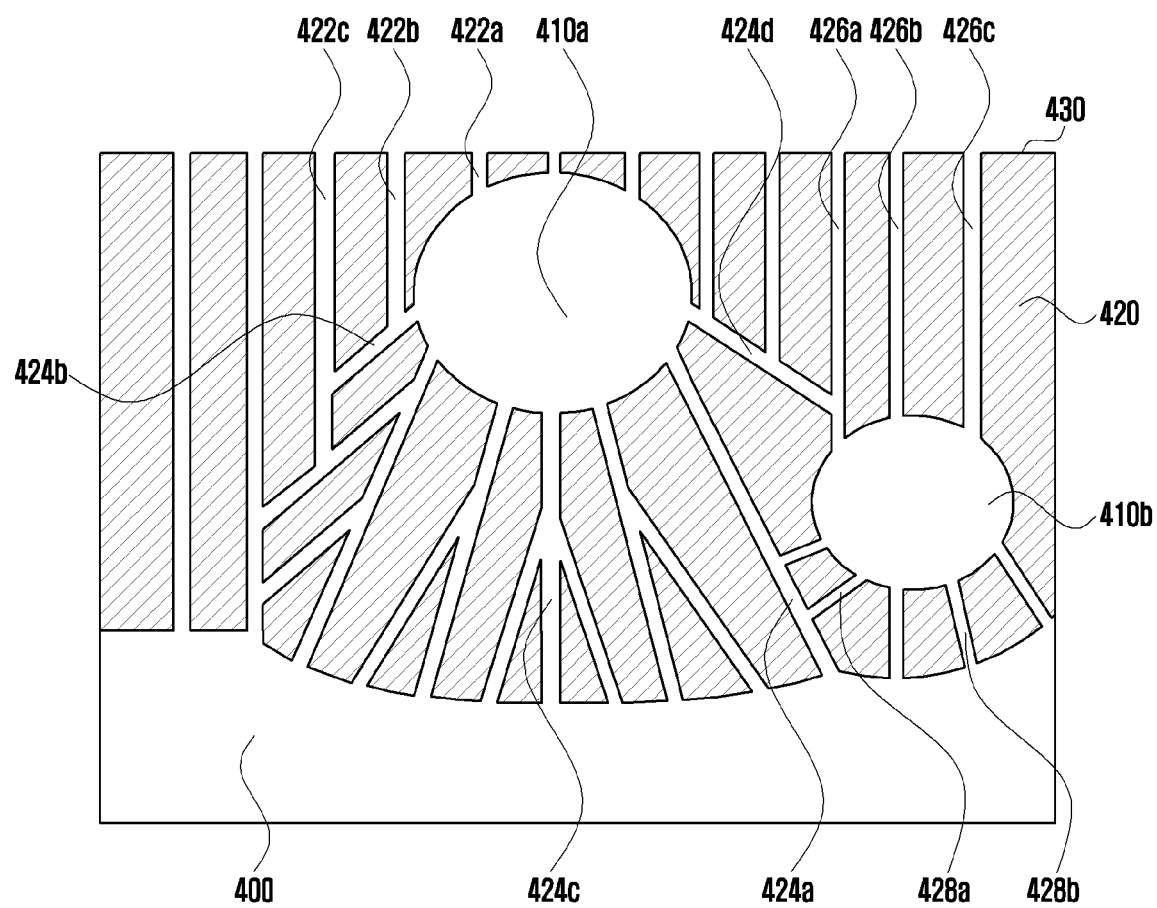
FIG. 4A is a view showing the shape of a metal housing according to various embodiments.

FIG. 4A is a view showing the shape of a housing according to various embodiments.

A device (e.g., electronic devices 100 and 300 or a portable communication device) according to various embodiments may include a housing. For example, at least a partial area of the housing may be made of metal. According to an embodiment, the metal housing may be at least a portion of a housing (e.g., a housing 110) forming at least a portion of the outer surface of an electronic device or a portable communication device.

For example, the metal housing can be at least a portion of side members or a rear plate of a front plate (e.g., front plates 102 and 320), a rear plate (e.g., rear plates 111 and 380), and side members (e.g., side bezel structures 118 and 310) of the device.

For example, the metal housing may be formed on the entire side member or only on a portion of the side member of the device. Alternatively, the metal housing may be formed on the entire rear plate or only on a portion of the rear plate. Alternatively, the metal housing may be formed on at least a portion of the side member or the rear plate of the device and may form at least a portion of the front plate.

Referring to FIG. 4A, the metal housing according to various embodiments may include a substrate 400 and an anodized layer 420.

According to various embodiments, the substrate 400 may include an aluminum alloy. For example, the aluminum alloy included in the substrate 400 may contain 90.0 to 99.8 wt % aluminum (Al). According to various embodiments, the aluminum alloy may contain 0.2 to 1.0 wt % (e.g., 0.3 to 0.8 wt %) manganese (Mn) of.

According to various embodiments, the anodized layer 420 may include an aluminum ($Al_2O_3$) layer disposed on the substrate 400 of the housing. For example, the anodized layer 420 may be an oxidized film that is formed by oxidation of at least a portion of the substrate 400.

The anodized layer 420, for example, may form at least a portion of an outer surface 430 of the substrate 400.

As shown in FIG. 4A, the anodized layer 420 according to various embodiments may have at least one hole 410a and 410b and a plurality of channels (e.g., 422a, 422b, 422c, 424a, 424b, 424c, 424d, 426a, 426b, 426c, 428a, and 428b).

For example, the at least one hole 410a and 410b of the anodized layer 420 may be an area that is formed by oxidation of at least a portion of other metal (e.g. an intermetallic compound) except for aluminum included in the substrate 400. For example, the other metal may be a silicon (Si)-manganese (Mn)-based intermetallic compound. For example, the at least one hole 410a and 410b may include at least a portion of a silicon oxide.

The anodized layer 420 may have a plurality of channels (e.g., 422a, 422b, 422c, 424a, 424b, 424c, 424d, 426a, 426b, 426c, 428a, and 428b). The channels may be pores that are formed by anodizing of at least a portion of the aluminum alloy contained in the substrate 400.

The channels according to various embodiments may include channels 422a, 422b, 422c, 426a, 426b, and 426c extending toward the inside of the substrate 400 from the outer surface 430 of the housing. Further, the channels may include channels 424a, 424b, 424c, 424d, 428a, and 428b extending toward the inside of the substrate 400 from the at least one hole 410a and 410b in the anodized layer 420.

For example, the channels (e.g., first channels 422a, 422b, and 422c and fourth channels 426a, 426b, and 426c) extending toward the inside of the substrate from at least a portion of the surface of the anodized layer 420 may be substantially perpendicular to the surface of the anodized layer 420.

For example, the channels 424a, 424b, 424c, 424d, 428a, and 428b extending toward the inside of the substrate 400 from the at least one hole 410a and 410b may extend in the same direction as or different directions from the first channels 422a, 422b, and 422c and the fourth channels 426a, 426b, and 426c.

For example, at least some channels 424a and 424b of the channels 424a, 424b, and 424c extending toward the substrate from the first hole 410a may extend in a direction (e.g., a second direction or a third direction) different from a first direction substantially perpendicular to the surface 430 of the anodized layer 420. For example, the different direction may make an angle of 0.1 to 80 degrees with the first direction.

As another example, at least some channel 424c of the channels 424a, 424b, 424c extending toward the substrate from the first hole 410a may by substantially perpendicular to the surface 430 of the anodized layer 420.

According to various embodiments, at least some channels 422a, 426a, 426b, and 426c of the channels (e.g., the first channels 422a, 422b, and 422c and the fourth channels 426a, 426b, and 426c) extending toward the inside of the substrate from at least a portion of the surface 430 of the anodized layer 420 may extend substantially perpendicularly to the surface 430 of the anodized layer 420, so they may meet the at least one hole 410a and 410b in the anodized layer 420.

The anodized layer 420 according to various embodiments may have a first channel 422a extending from the surface 430 of the anodized layer to at least one hole (e.g., the first hole 410a) in the first direction substantially perpendicular to the surface of the anodized layer 420, a second channel 424a extending toward the substrate in a direction (e.g., the second direction) different from the first direction, and a third channel 424b extending from at least one hole (e.g., the first hole 410a) in a direction (e.g., third direction) different from the first direction and the second direction. For example, the second direction and the third direction each may make angles of 0.1 to 80 degrees with the first direction.

According to various embodiments, at least one 422b, 422c, and 426a of the channels extending from the surface of the anodized layer 420 toward the substrate in the first direction may be connected with at least one 424b and 424d of the channels extending toward the substrate from the at least one hole 410a and 420b in the anodized layer 420 in a direction (e.g., the second direction or the third direction) different from the first direction.

According to various embodiments, at least one 426a of the channels extending from at least a portion of the surface of the anodized layer 420 to at least one hole (e.g., the second hole 410b) in the first direction may be connected with at least one 424b of the channels extending from at least one hole (e.g., the first hole 410a) in the anodized layer 420 toward the substrate in a direction (e.g., the second direction or the third direction) different from the first direction. For example, the second hole 410b may be formed under the first hole 410a (e.g., farther from the surface 430 of the anodized layer 420).

At least some 424a of the channels extending toward the substrate from a specific hole (e.g., the first hole 410a) may be connected with at least some 428a of the channels extending toward the substrate from another hole (e.g., the second hole 410b).

According to an embodiment, the housing may form at least a portion of the rear surface and/or the side of the device. The anodized layer 420 included in the housing may be formed on at least a portion of the side of the device and may not be formed on the rear surface of the device.

For example, the housing may communicate at least a portion of a display (e.g., a touch screen display) or a radio communication module (e.g., a communication processor) of the device. For example, at least a portion of the side of the housing on which the anodized layer is disposed may form an emitter (e.g., an antenna structure) electrically connected with the radio communication module.

Figure 4B:
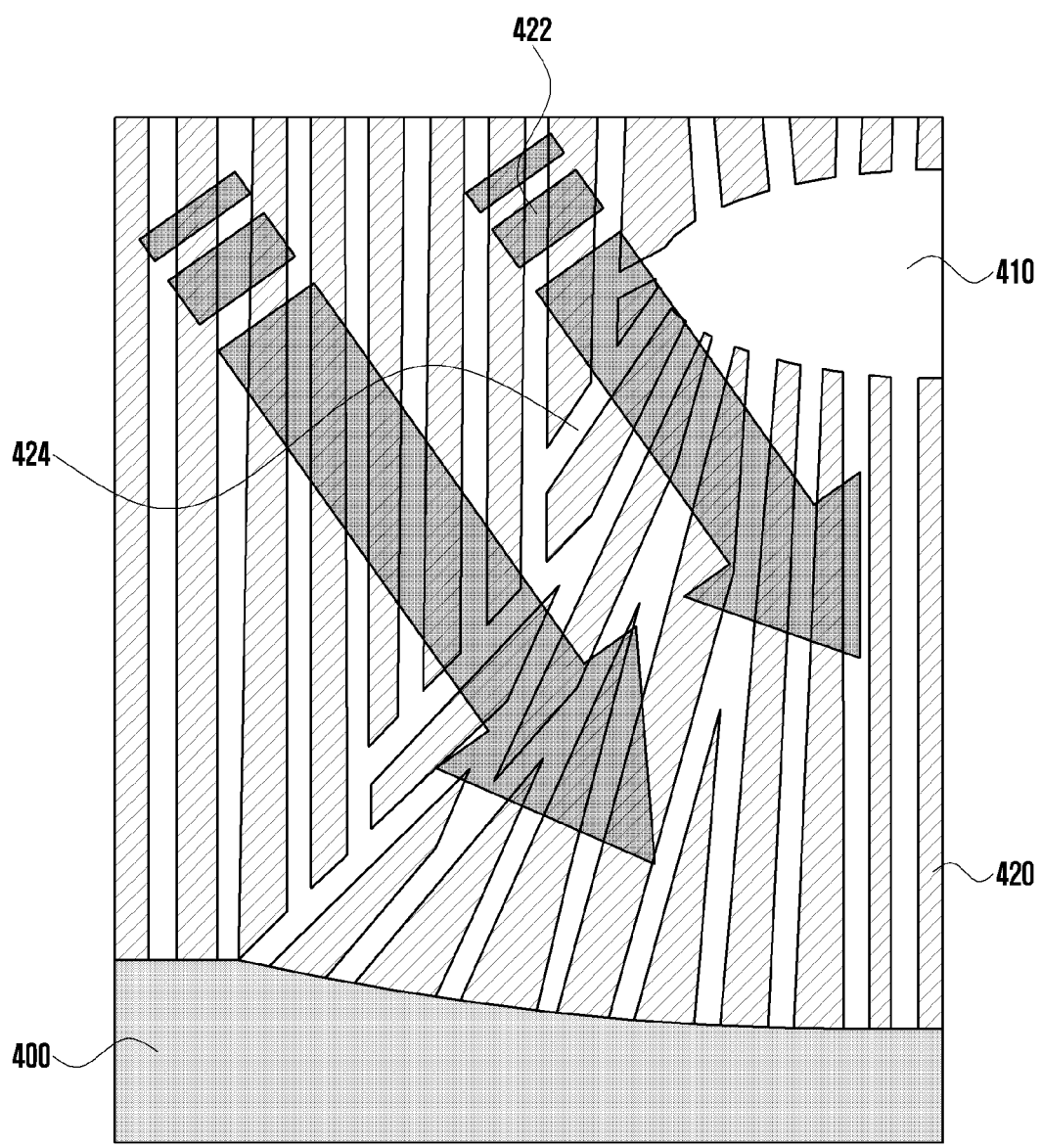
FIG. 4B is a view showing the shape of a metal housing having at least one hole according to various embodiments.
Figure 4C:
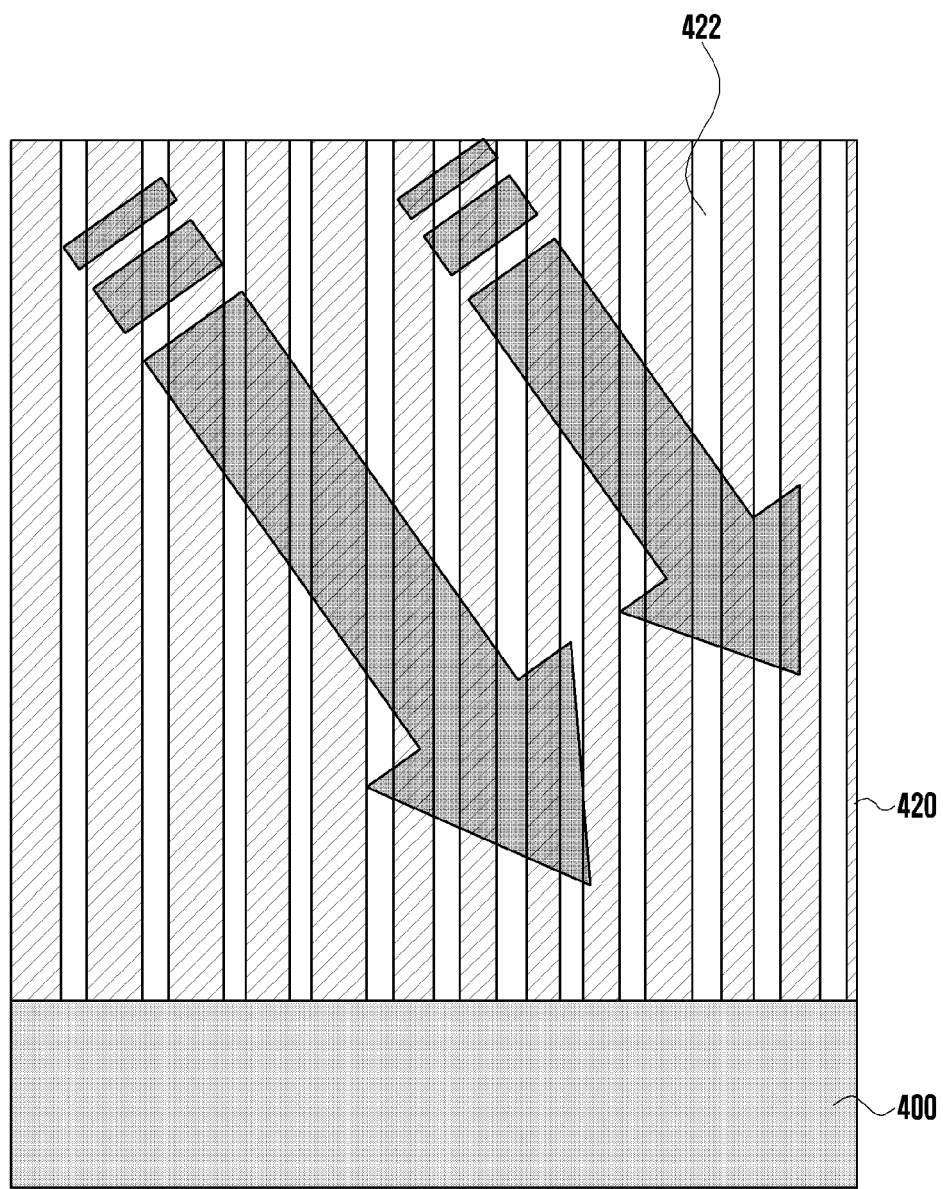
FIG. 4C is a view showing the shape of a metal housing not having the hole of FIG. 4B according to various embodiments.

FIGS. 4B and 4C are views showing a dispersion effect of external light by a metal housing according to various embodiments.

FIG. 4B is a view showing the shape of a housing having at least one hole according to various embodiments and FIG. 4C is a view showing the shape of a housing not having a hole according to an embodiment.

As shown in FIG. 4B, a housing according to various embodiments may include an anodized layer 420 and the anodized layer 420 may have at least one hole 410, a plurality of channels (e.g., a first channel 422) extending from an outer surface of the anodized layer 420 of a substrate toward the inside of the substrate, and channels (e.g., a second channel 424) extending toward the inside of the substrate from the at least one hole 410. For example, at least some of the channels (e.g., first channel 422) extending from the outer surface of the anodized layer 420 and at least some of the channels (e.g., second channel 424) extending from the at least one hole 410 may meet each other.

For example, as shown in FIG. 4B, when the housing has at least one hole 410, a first channel 422, and a second channel 424 and the first channel 422 and the second channel 424 meet each other, light from the outside can come in contact with an interface in the housing relatively much than when a housing does not has the hole 410 and the second channel 424 extending from the hole 410, as in the embodiment shown in FIG. 4C.

For example, when a housing has the hole 410 and the second channel 424 extending from the hole 410, the channel 424 meets at least one first channel 422, so the possibility of dispersion of external light by this structure can be increased.

A housing according to various embodiment increases an interface that external light can come in contact with, thereby being able to disperse much external light in comparison to a housing not having the hole 410 and the second channel 424. For example, a device (e.g., a portable communication device or an electronic device) can achieve a more uniform white color by increasing the possibility of dispersion of external light through the housing having the hole 410 and the second channel 424.

TABLE 1

| Engineering method | Measurement 1 | Measurement 2 | Measurement 3 |
|---|---|---|---|
| L* | 76.35 | 82.2 | 71.38 |
| a* | −0.51 | −0.32 | −0.54 |
| b* | 0.86 | 3.38 | 3.07 |
| Gloss (GU) | 102.6 | 44.4 | 64.3 |

Table 1 shows a result of measuring color characteristics of the metal housings shown in FIG. 4B and FIG. 4C.

The measurement 1 is the result of measuring a color coordinate and a gloss characteristic when a housing has the hole 410 and the second channel 424 extending from the hole 410, as show in FIG. 4B, and the measurement 2 and the measurement 3 are the result of measuring a color coordinate and a gross characteristic of a housing that has undergone a predetermined treatment (e.g., blasting or an electrolytic chemical treatment) for improving the color coordinate of the housing without having a separate hole or a second channel extending from the hole, as shown in FIG. 4C.

For example, the closer the L* value of the color coordinate values to 100 and the closer the a* and b* value closer to 0, the more the user feels the measurement target is close to white.

As in the results shown in Table 1, a housing having a hole and a second channel according to various embodiments can show excellent white color characteristic and a high-gloss characteristic in comparison to a housing not having them.

Figure 5A:
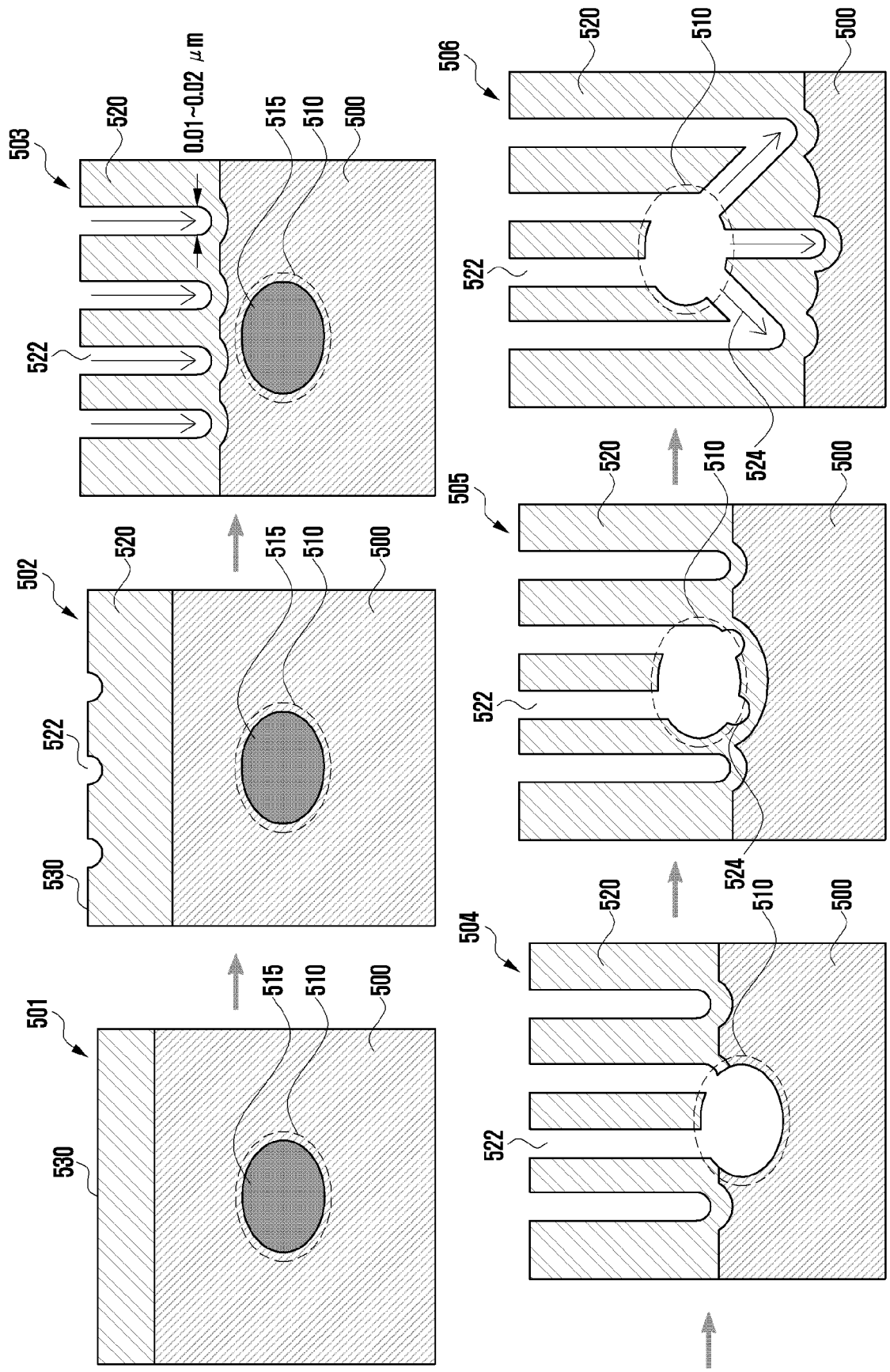
FIG. 5A is a view showing the process of forming a metal housing according to various embodiments.

FIG. 5A is a view showing a method of forming a metal housing according to various embodiments.

Referring to FIG. 5A a metal housing according to various embodiments, as indicated by reference numeral '501' may be obtained from a mother substrate 500 including an aluminum alloy.

In the part indicated by reference numeral '501', an anodized layer 520 can be formed in at least a portion of the outer surface 530 of the substrate 500 by anodizing that puts the substrate 500 into an electrolyte solution and then applies a voltage. For example, the anodized layer 520 may includes an aluminum oxide ($Al_2O_3$) layer.

According to various embodiments, the substrate 500 may include an aluminum alloy with purity of aluminum (Al) of over about 90%. For example, the substrate 500 may contain at least some of manganese (Mn), silicon (Si), steel (Fe), and magnesium (Mg).

For example, other metal (e.g., an intermetallic compound) 515 may be produced in the aluminum alloy substrate 500 through a process of mixing other metal (e.g., a specific intermetallic compound) except for aluminum into the aluminum alloy and then performing heat treatment.

For example, the other metal (e.g., an intermetallic compound) 515 except for the aluminum may be produced by mixing 0.2 to 1 wt % manganese (Mn) into the aluminum alloy substrate. For example, the other metal 515 may be a silicon (Si)-manganese (Mn)-based intermetallic compound and at least a portion of the other metal 515 may have a diameter of 0.1~1 μm.

According to various embodiments, the anodizing that puts the substrate 500 into an electrolyte solution and then applies a voltage may be performed under the conditions shown in Table 2.

TABLE 2

| | Conditions |
|---|---|
| Material | Extruded member or plate containing Si with purity of Al of over 90% |
| Electrolyte solution | One of acid solution such as sulfuric, oxalic, chromic solutions, alkaline sodium hydroxide-based solution, or non-aqueous solution |
| Solution temperature | 5~25° C. |
| Voltage | 5~20 V |
| Application time | 10~120 min. |

For example, the electrolyte solution may be any one of an acid solution such as sulfuric, oxalic, chromic solutions, an alkaline sodium hydroxide-based solution, or a non-aqueous solution, and may include other kinds of solutions that can anodize the substrate 500.

For example, the electrolyte solution may be any one of an acid solution such as sulfuric, oxalic, chromic solutions, an alkaline sodium hydroxide-based solution, or a non-aqueous solution, and may include other kinds of solutions that can anodize the substrate 500.

Referring to reference numeral '502', as the substrate 500 is anodized, an aluminum oxide ($Al_2O_3$) layer can be gradually formed from the outer surface 530 of the substrate 500. Further, as indicated by reference numerals '502' and '503', at least one pore may be gradually formed from the outer surface 530 of the anodized substrate 500.

The at least pore formed in the substrate 500 can function as a channel that can disperse external light.

For example, the pores formed in the substrate 500 may have a cross-section of which the diameter is 0.005 to 0.3 μm. According to an embodiment, the pores formed in the substrate 500 may have a substantially cylindrical shape. For example, the diameters of the pores may not be uniform and even one pore may have different diameters. For example, even in one pore, the diameter of a cross-section may be about 0.005 μm and the diameter of another cross-section may be about 0.03 μm. A cross-section of the pore may not be a circular shape.

For example, the pores may be formed perpendicular to the outer surface 530 of the substrate.

In the part indicated by reference number '504', as at least a portion of the outer surface 530 is anodized, an anodizing layer 520 (e.g., an aluminum oxide ($Al_2O_3$) layer) may be gradually formed in a housing according to various embodiment. When the anodized layer 520 meets the area where other metal (e.g., an intermetallic compound) 515 is disposed except for the aluminum of the substrate 500, at least a portion of the other metal 515 is oxidized and dissolved in the electrolyte solution and a hole area 510 is formed in the area 510 where the other metal 515 was positioned.

For example, the other metal 515 may be a silicon (Si)-manganese (Mn)-based intermetallic compound. In the silicon-manganese-based intermetallic compound, for example, the manganese component is oxidized and dissolved in the electrolyte solution, but even though the silicon component is oxidized, at least some may remaining in the hole area 510 without being dissolved.

In the part indicated by reference numeral '505', as anodizing is performed, at least one pore 542 extending into a substrate 500 from at least a portion of a hole area 510 may be formed in a housing according to various embodiments. For example, a pore 524 extending from the hole area 510 may be formed in the same direction as or a different direction from a channel (e.g., a first channel 522) extending from the outer surface 530. For example, the pore 524 extending toward the inside of the substrate from the at least one hole area 510 of the anodizing layer 520 can function as a channel (e.g., a second channel) that induces dispersion of external light.

Referring to the part indicated by reference numeral '506', in a housing according to various embodiments, a pore 524 extending toward the inside of a substrate from a hole area 510 may meet at least one other pore 522. For example, the pore 524 growing from the hole area 510 can meet at least a portion of the pore 522 formed substantially perpendicular to the outer surface 530 from the outer surface 530 of the substrate.

Figure 5B:
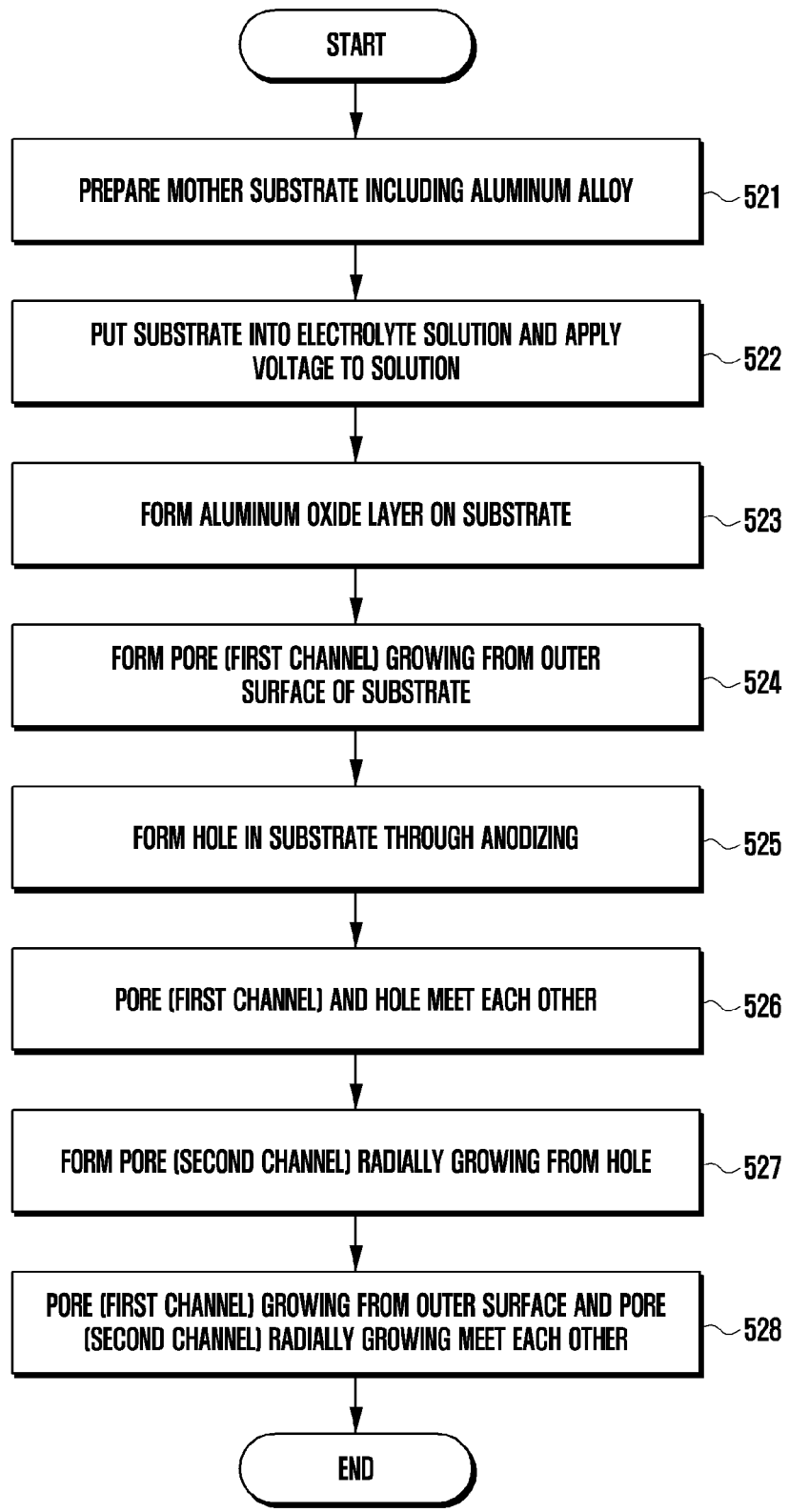
FIG. 5B is a flowchart showing the process of forming a metal housing according to various embodiments.

FIG. 5B is a flowchart showing a method of forming a metal housing according to various embodiments.

A housing according to various embodiments may be formed through a process (process 521) of preparing a mother substrate including an aluminum alloy and a process (process 522) of putting the mother substrate into an electrolyte solution and then applying a predetermined magnitude of voltage to the electrolyte solution. For example, the mother substrate may be a substrate having other metal (intermetallic compound) except for aluminum in the aluminum alloy. For example, the magnitude of the voltage that is applied to the electrolyte solution may be 5 to 20V.

According to various embodiments, in a process 523, when a voltage is applied with the mother substrate in the electrolyte solution, an aluminum oxide ($Al_2O_3$) layer may be formed in the mother substrate. In a process 524, when a voltage is applied with the mother substrate in the electrolyte solution, a pore (e.g., a first channel) may be formed toward the inside of the substrate from the outer surface of the substrate in the aluminum oxide layer.

According to various embodiments, in a process 525, as the aluminum oxide layer is gradually formed in the substrate, at least one hole may be formed in the substrate. The hole may be formed at the area where other metal (e.g., an intermetallic compound) except for aluminum was positioned.

According to various embodiments, in a process 526, the pore growing from the outer surface of the substrate may meet at least one of the holes.

According to various embodiments, in a process 527, as anodizing keeps progressing, a pore (second channel) may be radially formed from the at least one hole in the substrate.

According to various embodiments, in a process 528, the pore (first channel) growing toward the inside of the substrate from the outer surface and the pore (second channel) radially growing from the at least one hole may meet each other.

Figure 5C:
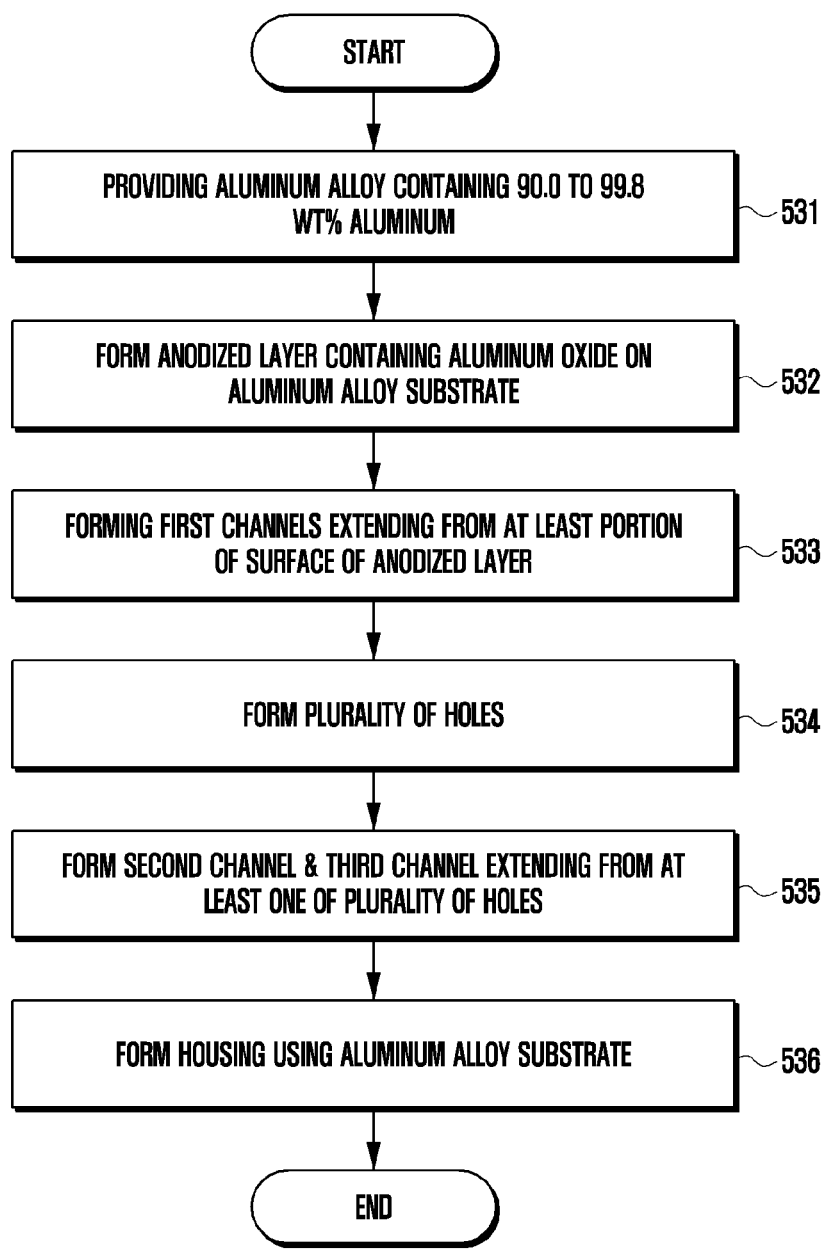
FIG. 5C is a flowchart showing a method of manufacturing an electronic device according to various embodiments.

FIG. 5C is a flowchart showing a method of manufacturing an electronic device according to various embodiments.

Referring to FIG. 5, a method of manufacturing an electronic device according to various embodiments may include a process of providing an aluminum alloy substrate in a process 531 to form a housing that forms at least a portion of the outer surface of the electronic device. For example, the aluminum alloy substrate may contain 90.0 to 99.8 wt % aluminum.

Next, in an operation 532, the method of manufacturing an electronic device may include a process of forming an anodized layer containing aluminum oxide ($Al_2O_3$) on the surface of the aluminum alloy substrate.

According to various embodiments, in a process 533, first channels extending from at least a portion of the surface of the anodized layer may be formed in the aluminum alloy substrate. For example, a plurality of first channels extending from at least a portion of the surface of the anodized layer toward the aluminum alloy substrate in a first direction that is substantially perpendicular to the at least a portion may be formed in the aluminum alloy substrate.

According to various embodiments, in a process 534, a plurality of holes may be formed in the aluminum alloy substrate. For example, a plurality of holes including a first hole and a second hole may be formed at at least one of the positions where at least one channel of the first channels and other metal except for aluminum meet, in the aluminum alloy substrate. For example, the first hole or the second hole may include at least a portion of a silicon oxide.

According to various embodiments, in a process 535, a second channel and a third channel extending from at least one of the holes may be formed in the aluminum alloy substrate. For example, a second channel extending toward the aluminum alloy substrate in a second direction different from the first direction from at least one of the holes and a third channel extending toward the aluminum alloy substrate in a third direction different from the first direction and the second direction may be formed in the aluminum alloy substrate. For example, at least one of the second channel and the third channel may meet at least one of the first channels. According to an embodiment, the second channel may meet two or more of the first channels.

Next, in a process 536, it is possible to form a housing using the aluminum alloy substrate having the channels and the holes. For example, it is possible to form a housing for forming at least a portion of the outer surface of the electronic device using the aluminum alloy substrate including the anodized layer having the first channels, the second channel, and the third channel.

Figure 6:
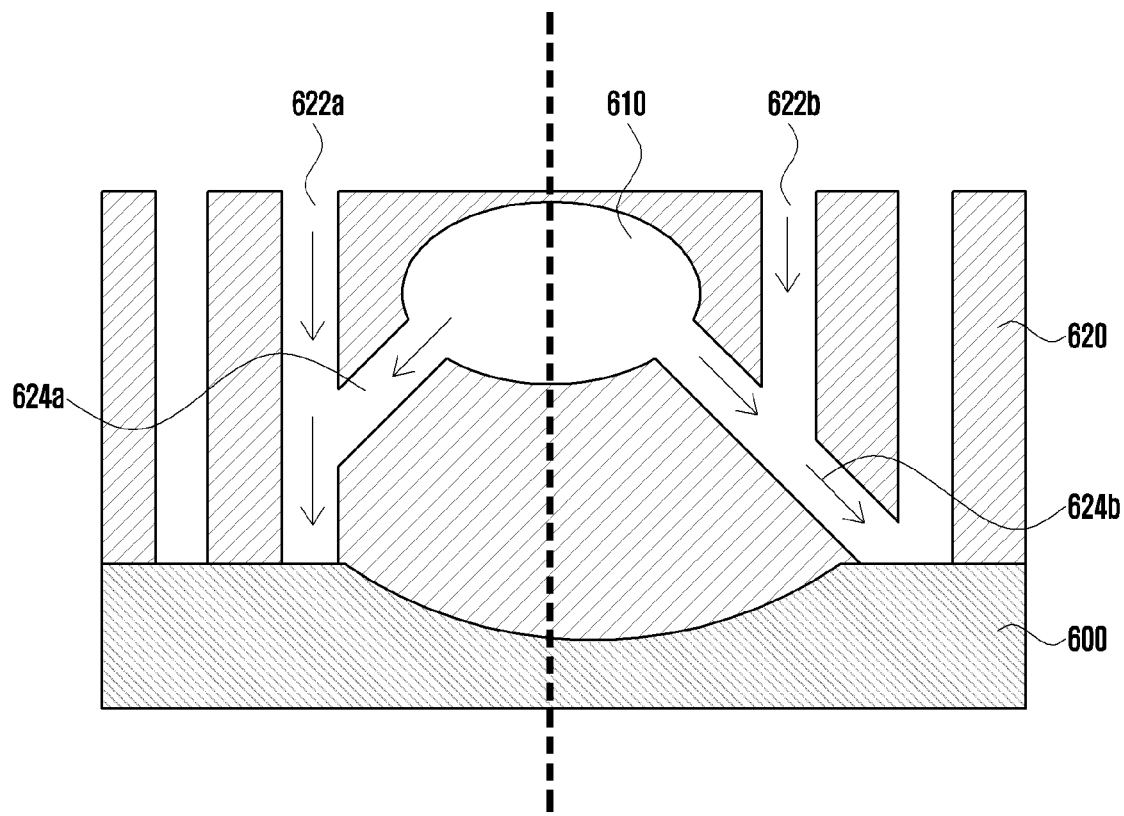
FIG. 6 is a view showing the shape of channels of a metal housing according to various embodiments.

FIG. 6 is a view showing the shape of channels of a metal housing according to various embodiments.

According to various embodiments, an anodized layer 620 of a metal housing may include channels 622a and 622b extending from an outer surface in a first direction substantially perpendicular to the outer surface and channels 624a and 624b extending from at least one hole 610 toward the inside of a substrate in a different direction from the first direction.

Referring to FIG. 6, at least some of the channels extending from the outer surface of the anodized layer 620 and at least some of the channels extending from the at least one hole 610 may meet each other.

For example, the channels meeting each other may be changed in shape in accordance with what channel of the channels reaches first the position where they meet in the process of forming the channels in the process of forming the channels.

For example, when a first channel 622a extending from the outer surface of the substrate perpendicularly to the outer surface is formed first, a second channel 624a extending from the hole 610 in a different direction from the direction perpendicular to the outer surface is formed later, and the first channel 622a and the second channel 624a meet each other, a channel extending toward the substrate 600 may be formed in a shape extending in the forming direction of the first channel 622a that was formed first, that is, in the direction perpendicular to the outer surface.

Alternatively, when the second channel 624b extending from the hole 610 is formed first in a different direction from the first direction perpendicular to the outer surface, the first channel 622b extending from the outer surface in the first direction is formed later, and the first channel 622b and the second channel 624b meet each other, a channel may be formed in shape that stops growing in the forming direction of the first channel 622b and extends in the forming direction of the second channel 624b that was formed first.

According to various embodiments, the earlier the second channel extending from the hole is formed, the more the positions where the first channel and the second channel can meet each other, so more interfaces that can disperse external light can be formed.

Figure 7A:
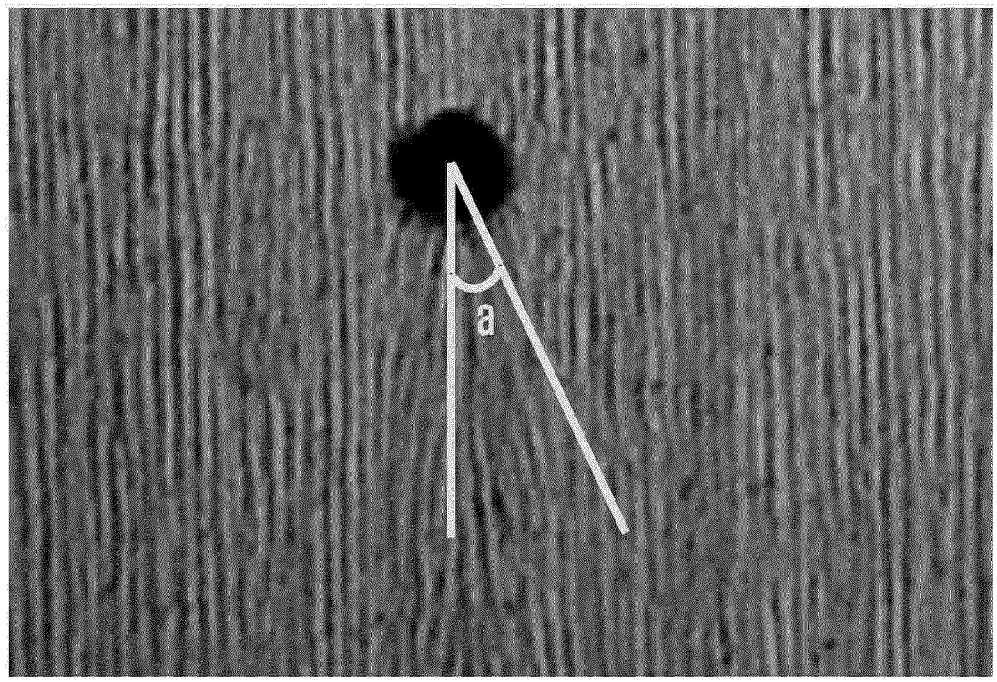
FIGS. 7A and 7B are views showing the characteristics of a second channel according to various embodiments.
Figure 7B:
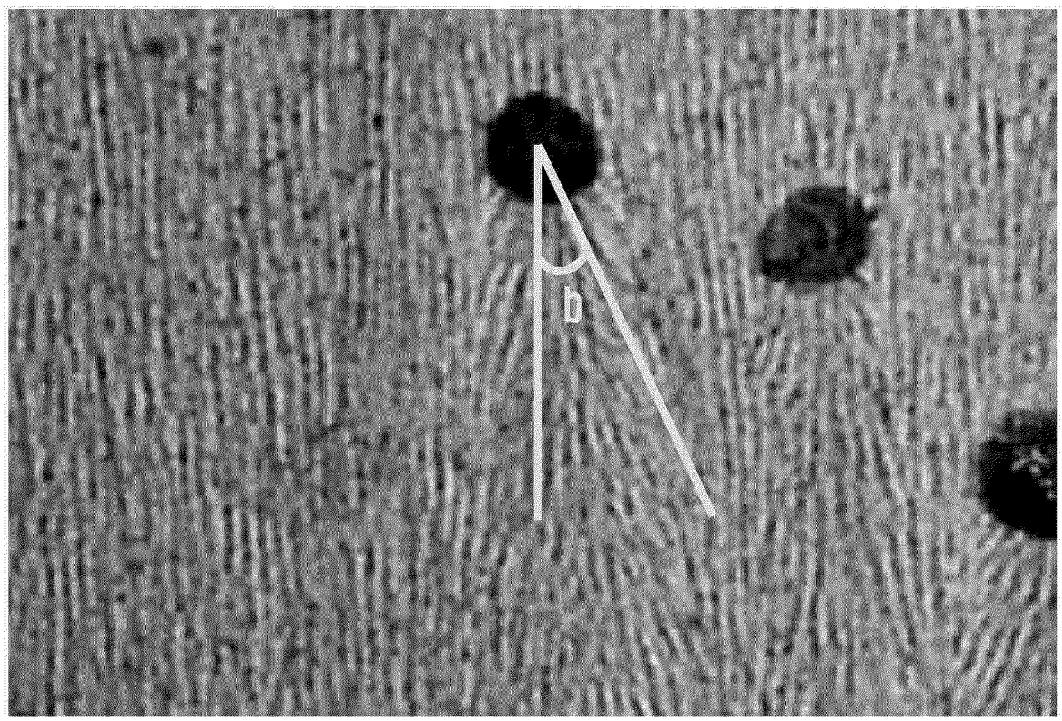

FIGS. 7A and 7B are views showing the characteristics of a channel (pore) according to forming conditions of the channel according to various embodiments.

According to various embodiments, the direction in which a channel (e.g., second channel) included in a housing of a device and extending toward the inside of the substrate of the housing from at least one hole may be controlled by changing an oxidation condition for forming the channel.

According to various embodiments, the larger angle the forming direction (hereafter, a "second direction") of the second channel makes with a first direction perpendicular to the outer surface of a substrate, the more the interfaces that can disperse external light can be formed.

For example, the smaller the voltage value, which is applied to a substrate, of anodizing conditions for forming the second channel, the larger angle the second direction in which the second channel is formed can make with the first direction.

FIG. 7A is an image of a cross-section of a housing formed through anodizing when a voltage of about 14V was applied in accordance with an embodiment and FIG. 7B is an image of a cross-section of a housing formed through anodizing when a voltage of about 8V was applied with other conditions maintained as being the same.

Referring to FIGS. 7A and 7B, it can be seen that the smaller the magnitude of the voltage that is applied in anodizing, the larger the angle difference between the first direction and the second direction.

For example, as shown in FIG. 7A, in the housing formed when a voltage of about 14V was applied, the angle 'a' between the forming direction of a second channel and the forming direction of a first channel can be about 15 degrees.

For example, as shown in FIG. 7B, in the housing formed when a voltage of about 8V was applied, the angle 'b' between the forming direction of a second channel and the forming direction of a first channel can be about 22 degrees.

Further, though not shown, when the magnitude of a voltage that is applied in anodizing is low, the anodized layer of the housing can have more pores in comparison to when the anodized layer is formed when a larger magnitude of voltage is applied. For example, the pores can function of channels.

For example, the lower the magnitude of a voltage that is applied in anodizing, the more pores the anodized layer of a housing includes, so dispersion of external light increase, and accordingly, a color closer to white can be achieved. However, since the lower the magnitude of a voltage, the more pores the anodized layer includes, the surface hardness characteristic may be deteriorated.

According to an embodiment, the surface hardness of a housing formed when a voltage of about 8V is applied, as shown in FIG. 7B, may be about 432 Hv, and the surface hardness of a housing formed when a voltage of about 14V is applied, as shown in FIG. 7A, may be about 576 Hv.

For example, a housing may be formed by applying an appropriate voltage in consideration of the color characteristic and the surface hardness characteristic of the housing. For example, a housing according to various embodiments may be formed through anodizing by applying a voltage of 5 to 20V.

According to various embodiments, the sizes of holes and the number of pores in a housing may be determined in consideration of both the color characteristic and the surface hardness characteristic.

Figure 7C:
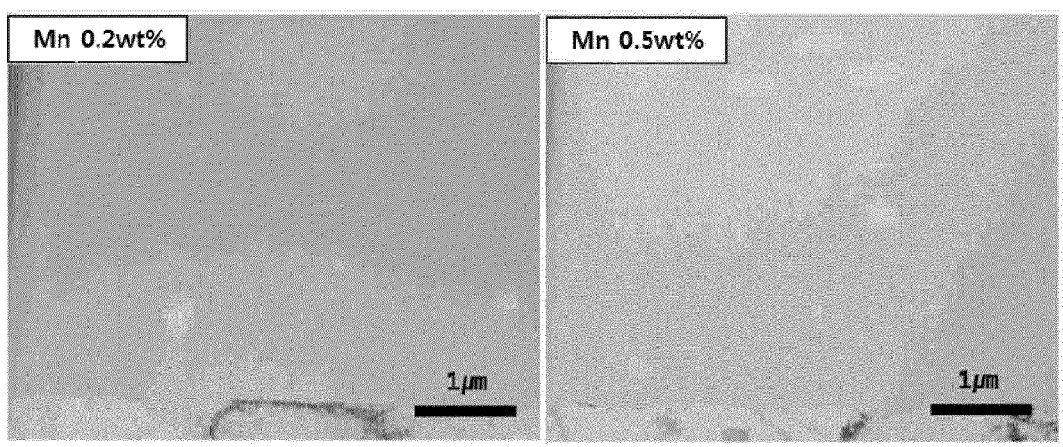
FIG. 7C is an image showing the characteristics of a hole according to the contents of metals except for aluminum in an aluminum alloy substrate according to various embodiments.

FIG. 7C is an actual image of the shapes of holes formed in housings according to an embodiment when aluminum alloy substrate for forming the housings contain 0.2 wt % manganese (Mn) and 0.5 wt % manganese (Mn).

For example, a mother substrate for forming a housing may include an aluminum alloy with purity of aluminum (Al) of over 90% and the aluminum alloy of the substrate may include other metal (e.g., an intermetallic compound), which forms a hole by oxidizing through anodizing, except for aluminum.

For example, in an electronic device, it is possible to determine the sizes and the number of holes that are formed in a housing after anodizing by adjusting the content of other metal except for the aluminum.

For example, the other metal (or intermetallic compound) may be produced by mixing 0.2 to 1.0 wt % (e.g., 0.3 to 0.8 wt %) manganese (Mn) in an aluminum alloy substrate. For example, the other metal may be a silicon (Si)-manganese (Mn)-based intermetallic compound and may have a diameter of 0.1~1 μm. For example, when a housing according to various embodiment is formed using an aluminum alloy substrate containing 0.2 to 1.0 wt % manganese (Mn), the diameter of the holes formed in the housing may be determined as 0.1~1 μm that is the diameter of the other metal (intermetallic compound).

For example, when the holes in the anodized layer of the housing has a diameter of 0.1~1 μm, the anodized layer should have over ten holes per area of 100 μm².

According to various embodiments, an aluminum alloy substrate included in a housing contains 90.0 to 99.8 wt % aluminum (Al) and 0.2 to 1.0 wt % (e.g., 0.3 to 0.8 wt %) other metal (e.g., a silicon (Si)-manganese (Mn)-based intermetallic compound) except for the aluminum, thereby being able to satisfy the condition of the number of holes per unit area.

For example, as shown in FIG. 7, when the aluminum alloy substrate contains 99.8 wt % aluminum and 0.2 wt % manganese, the number of holes per unit area of 100 μm² may be about 13, and when the aluminum alloy substrate contains 99.0 wt % aluminum and 0.5 wt % manganese, the number of holes per unit area 100 μm² may be about 47.

For example, the number of holes that is formed when a housing according to various embodiments is formed using an aluminum alloy substrate containing 90.0 to 99.8 wt % aluminum (Al) and 0.2 to 1.0 wt % manganese (Mn) may be over 10 per area of 100 μm² that is an odd number required for the unit area, so an effect of dispersing external area can be achieved.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least part of a device (e.g., modules or functions thereof) or a method (e.g., operations) according to the present disclosure be implemented, for example, by an instruction stored in a computer-readable storage media in a form of a programming module. When the instruction is executed by at least one processor, the at least one processor may perform a function corresponding to the instruction. The computer readable storage media may be, for example, the memory.

The computer-readable storage media may include Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as Read Only Memory (ROM), Random Access Memory (RAM), or flash memory for storing and executing program commands (e.g., a programming module). Further, the program command may include a machine language code created by a compiler and a high-level language code executable by a computer using an interpreter. The foregoing hardware device may be configured to be operated according to at least one software module to perform an operation of the present disclosure, or software modules may be configured to be operated according to the hardware device.

According to various embodiments of the module and the program module may include at least one of above elements or may omit some elements or include other elements. According to various embodiments, operations performed by the module, the program, or another component may be carried out sequentially, in parallel, repeatedly, or heuristically, or one or more of the operations may be executed in a different order or omitted, or one or more other operations may be added.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. A portable communication device comprising a housing configured to form at least a portion of an outer surface of the portable communication device,
   wherein at least a partial area of the housing includes:
      an aluminum alloy substrate containing 90.0 to 99.8 weight percent (wt %) aluminum (Al) and 0.2 to 1.0 wt % manganese (Mn); and
      an anodized layer formed on the aluminum alloy substrate and containing an aluminum oxide ($Al_2O_3$),
   wherein the anodized layer has:
      a plurality of holes formed in the anodized layer and including a first hole and a second hole; and
      a plurality of first channels extending from at least a portion of a surface of the anodized layer to the first hole in a first direction substantially vertical thereto, a second channel extending from the first hole toward the aluminum alloy substrate in a second direction different from the first direction, and a third channel extending from the first hole toward the aluminum alloy substrate in a third direction different from the first direction and the second direction.

2. The portable communication device of claim 1, wherein the aluminum alloy contains 0.3 to 0.8 wt % manganese (Mn).

3. The portable communication device of claim 1, wherein the housing forms at least a portion of a rear surface of the portable communication device and at least a portion of a side of the portable communication device, and
the anodized layer is formed in at least a portion of the side and is not formed in the rear surface.

4. The portable communication device of claim 1, wherein the plurality of first channels, the second channel, and the third channel each have a cross-section having a diameter of 0.005 to 0.03 µm.

5. The portable communication device of claim 4, wherein the first hole has a diameter of 0.1 to 1 µm.

6. The portable communication device of claim 1, wherein the second direction in which the second channel extends and the third direction in which the third channel extends each make an angle of 0.1 to 80 degrees with the first direction.

7. A portable communication device of claim 1, wherein the second hole is formed under the first hole,
a plurality of fourth channels extending from at least a portion of the surface of the anodized layer to the second hole in the first direction is formed, and
the second channel or the third channel meets at least one channel of the plurality of fourth channels.

8. The portable communication device of claim 1, further comprising a radio communication module at least partially accommodated in the housing,
wherein at least a portion of a side of the housing including the anodized layer forms an emitter electrically connected with the radio communication module,
and the portable communication device further comprises a touch screen display at least partially accommodated by the housing.

9. An electronic device comprising:
a housing configured to form at least a portion of a rear side of the electronic device and at least a portion of a side of the electronic device; and
a display at least partially accommodated by housing and visually exposed outside the electronic device,
wherein at least a portion of the housing includes:
an aluminum alloy substrate containing 90.0 to 99.8 wt % aluminum (Al); and
an anodized layer including an aluminum oxide ($Al_2O_3$) formed on the aluminum alloy substrate,
wherein the anodized layer includes:
a plurality of holes including a first hole and a second hold formed in the anodized layer; and
a plurality of first channels extending from at least a portion of a surface of the anodized layer to the first hole in a first direction substantially vertical thereto,
a second channel extending from the first hole toward the aluminum alloy substrate in a second direction different from the first direction, and a third channel extending from the first hole toward the aluminum alloy substrate in a third direction different from the first direction and the second direction.

10. The electronic device of claim 9, wherein the aluminum alloy substrate contains 0.2 to 1.0 wt % manganese (Mn),
the aluminum alloy substrate has over 10 holes per area of 100 µm², and
the anodized layer is formed in at least a portion of the side and is not formed in the rear surface.

11. The electronic device of claim 9, wherein the plurality of first channels, the second channel, and the third channel each have a cross-section having a diameter of 0.005 to 0.03 µm, and
the first hole has a diameter of 0.1 to 1 µm.

12. A method of manufacturing an electronicdevice, the method comprising:
providing an aluminum alloy substrate containing 90.0 to 99.8 wt % aluminum (Al);
forming an anodized layercontaining an aluminum oxide ($Al_2O_3$) on a surface of the aluminum alloy substrate;
forming a plurality of first channels extending from at least a portion of a surface of the anodized layer to the aluminum alloy substrate in a first direction substantially vertical thereto;
forming a plurality of holes including a first hole and a second hole at at least one position where at least one channel of the plurality of first channels meets a non-aluminum compound by dissolving the non-aluminum compound;
forming a second channel extending from at least one hole of the plurality of holes toward the aluminum alloy substrate in a second direction different from the first direction and a third channel extending toward the aluminum alloy substrate in a third direction different from the first direction and the second direction; and
forming a housing configured to form at least a portion of an outer surface of the electronic device using the aluminum alloy substrate having the anodized layer having the first channels, the second channel and the third channel.

13. The method of claim 12, wherein at least one channel of the second channel and the third channel meets at least one first channel of the plurality of first channels.

14. The method of claim 12, wherein the first hole or the second hole includes a silicon oxide.

15. The method of claim 12, wherein the second channel meets at least two or more first channels of the plurality of first channels, and
the plurality of first channels, the second channel, and the third channel each have a cross-section having a diameter of 0.005 to 0.03 µm.

* * * * *